United States Patent
Kuroda et al.

(10) Patent No.: US 6,927,552 B2
(45) Date of Patent: Aug. 9, 2005

(54) CONTROL APPARATUS FOR ON-VEHICLE ELECTRICITY STORAGE DEVICE

(75) Inventors: Shigetaka Kuroda, Utsunomiya (JP); Kenji Nakano, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 10/658,461

(22) Filed: Sep. 10, 2003

(65) Prior Publication Data

US 2004/0051500 A1 Mar. 18, 2004

(30) Foreign Application Priority Data

Sep. 13, 2002 (JP) .......................................... 2002-268856

(51) Int. Cl.$^7$ ................................................ H02J 7/00
(52) U.S. Cl. ............................................. 320/104; 320/133
(58) Field of Search ................................. 320/103, 104, 320/132, 133, 134, 139, 141; 290/155, 19, 32, 40 C, 40 F (56) References Cited

U.S. PATENT DOCUMENTS

| | | | | |
|---|---|---|---|---|
| 3,890,556 A | * | 6/1975 | Melling et al. ............. | 320/161 |
| 5,115,182 A | * | 5/1992 | Ehmke et al. .............. | 320/136 |
| 5,497,070 A | * | 3/1996 | Furutani et al. ............ | 322/23 |
| 5,614,804 A | * | 3/1997 | Kayano et al. ............. | 320/134 |
| 5,760,486 A | * | 6/1998 | Uchinami et al. ........ | 290/40 C |
| 5,808,445 A | * | 9/1998 | Aylor et al. ................ | 320/132 |
| 5,886,500 A | * | 3/1999 | Iwatani et al. ............. | 320/104 |
| 5,955,865 A | * | 9/1999 | Koike et al. ................ | 320/104 |
| 5,963,140 A | * | 10/1999 | Kawaguchi et al. ... | 340/815.58 |
| 6,104,166 A | * | 8/2000 | Kikuchi et al. ............. | 320/132 |
| 6,147,473 A | * | 11/2000 | Koo ........................... | 320/160 |
| 6,215,282 B1 | * | 4/2001 | Richards et al. ............ | 320/160 |
| 6,225,784 B1 | * | 5/2001 | Kinoshita et al. ........... | 320/132 |
| 6,232,748 B1 | * | 5/2001 | Kinoshita .................... | 320/132 |
| 6,294,843 B1 | * | 9/2001 | Kato et al. ................ | 290/40 C |
| 6,344,734 B1 | * | 2/2002 | Iwatani et al. ................ | 322/28 |
| 6,356,083 B1 | * | 3/2002 | Ying ........................... | 324/426 |
| 6,483,272 B1 | * | 11/2002 | Terada et al. ................ | 320/103 |
| 6,518,732 B2 | * | 2/2003 | Palanisamy ................. | 320/147 |
| 6,653,819 B2 | * | 11/2003 | Nagata et al. ............... | 320/133 |
| 6,674,265 B2 | * | 1/2004 | Yoshida et al. ............. | 320/125 |
| 6,856,866 B2 | * | 2/2005 | Nakao ........................ | 701/22 |

FOREIGN PATENT DOCUMENTS

JP 07-212986 8/1995

* cited by examiner

Primary Examiner—Michael Sherry
Assistant Examiner—Samuel Berhanu
(74) Attorney, Agent, or Firm—Arent Fox PLLC (57) ABSTRACT

A control apparatus for an on-vehicle electricity storage device, which enables an appropriate charging of the on-vehicle electricity storage device while preventing degradation of the on-vehicle electricity storage device. The counter value of a high voltage maintaining counter CVB14V and the timer value of a sustain time subtraction timer TACG2 are increased over the period after time t1 in which the inter-terminal voltage VB of the battery is maintained to be greater than the predetermined mode switching threshold voltage #VB14V. The counter value and the timer value decrease over the period from time t2 to time t3. At time t3, the operation mode is switched from a non-charging mode to a charging mode.

8 Claims, 8 Drawing Sheets

FIG.4A CONSUMED ELECTRICAL POWER

FIG.4B INTER-TERMINAL VOLTAGE VB

FIG.4C SUSTAIN TIME SUBTRACTION TIMER

FIG.4D OPERATION MODE

FIG. 7A CONSUMED ELECTRICAL POWER
FIG. 7B INTER-TERMINAL VOLTAGE VB
FIG. 7C SUSTAIN TIME SUBTRACTION TIMER
FIG. 7D OPERATION MODE

FIG. 8

CONTROL APPARATUS FOR ON-VEHICLE ELECTRICITY STORAGE DEVICE

BACKGROUND OF THE INVENTION

1. Field of the Invention

The present invention relates to a control apparatus for an on-vehicle electricity storage device such as a 12-volt lead storage battery.

2. Description of the Related Art

Conventional electrical power generation control apparatuses for vehicles are known, which perform control operations in such a manner that the inter-terminal voltage of an on-vehicle battery such as a 12-volt lead storage battery, which is provided for operating various on-vehicle electrical devices, is measured, the amount of energy discharged from the battery is calculated based on accumulated products each of which is obtained by multiplying the amount of decrease in the inter-terminal voltage by the time during which the inter-terminal voltage has decreased, and when the amount of energy discharged from the battery exceeds a predetermined value, a generator, which is driven by an internal combustion engine for charging the on-vehicle battery, is controlled so as to stop the power generation or so as to decrease the amount of power generation (see, for example, Japanese Unexamined Patent Application, First Publication No. Hei 07-212986).

In such an electrical power generation control apparatus for a vehicle, because the amount of energy discharged from the battery is calculated based on accumulated products each of which is obtained by multiplying the amount of decrease in the inter-terminal voltage by the time during which the inter-terminal voltage has decreased, it is determined that the battery has discharged (i.e., the state of charge of the battery has decreased) when the inter-terminal voltage of the on-vehicle battery has decreased.

In general, when the amount of energy being discharged from the battery is decreased, i.e., the amount of energy being taken out from the on-vehicle battery is decreased, the power generation by the generator is stopped, and the charging operation for the battery is also stopped; however, in the case of a 12-volt lead storage battery or the like, the inter-terminal voltage may remain steady the charging is stopped, but may begin to decrease after the lapse of a certain time after the charging is stopped.

In such a case, there is a time lag between the timewise change in the inter-terminal voltage of the on-vehicle battery and the timewise change in the state of charge of the battery; therefore, a problem is encountered in that the timewise change in the state of charge cannot be accurately estimated. When the timewise change in the state of charge of the on-vehicle battery cannot be accurately estimated, it is difficult to appropriately control the power generation operation of the generator which is provided for charging the on-vehicle battery, which may lead to a reduction in the useful life of the on-vehicle battery because the on-vehicle battery is frequently placed in an over-discharged state, and also which may lead to a degradation of the fuel economy of the vehicle because the generator is frequently operated by the internal combustion engine.

SUMMARY OF THE INVENTION

In view of the above circumstances, an object of the present invention is to provide a control apparatus for an on-vehicle electricity storage device, which enables appropriate charging of the on-vehicle electricity storage device while preventing degradation of the on-vehicle electricity storage device.

In order to achieve the above object, the present invention provides a control apparatus for an on-vehicle electricity storage device, which is installed in a vehicle having an internal combustion engine as a power source, a motor capable of electrical power generation, and an electricity storage device. The control apparatus includes: an electrical power consumption measuring device for measuring the electrical power being consumed in the vehicle; a charge control device for controlling the electricity storage device depending on the consumed electrical power measured by the electrical power consumption measuring device so that the electricity storage device is placed in and out of a charging mode in which electrical energy, which is converted from the output power of the internal combustion engine or from a portion of the kinetic energy of the vehicle using the motor, is charged in the electricity storage device; an inter-terminal voltage measuring device for measuring the inter-terminal voltage of the electricity storage device; a voltage sustain time measuring device for measuring a voltage sustain time which begins when the electricity storage device is placed out of the charging mode by the charge control device, and during which the inter-terminal voltage measured by the inter-terminal voltage measuring device is maintained to be equal to or greater than a predetermined value; and a non-charge sustain time setting device for setting a non-charge sustain time, during which the electricity storage device is kept out of the charging mode, depending on the sustain time measured by the voltage sustain time measuring device.

According to the above control apparatus for an on-vehicle electricity storage device, when the electricity storage device such as a 12-volt lead storage battery is placed out of the charging mode because it is determined by the electrical power consumption measuring device that the electrical power being consumed in the vehicle is less than a predetermined value, and when it is determined by the inter-terminal voltage measuring device that the inter-terminal voltage of the electricity storage device is equal to or greater than a predetermined value, it is determined that the state of charge of the electricity storage device is equal to or greater than a predetermined value, and the non-charge sustain time setting device sets a longer non-charge sustain time as the sustain time measured by the voltage sustain time measuring device is longer.

As a result, the electrical power generation operation of the motor, which is provided for charging the electricity storage device, can be appropriately controlled; therefore, a reduction in the useful life of the electricity storage device can be prevented, which could occur if the electricity storage device is too frequently placed in an over-discharged state, and also a reduction in the vehicle's fuel economy can be prevented, which could occur if the internal combustion engine is too frequently used for electrical power generation.

The above control apparatus for an on-vehicle electricity storage device may further include a charging mode executing device for placing the electricity storage device in the charging mode, regardless of the consumed electrical power measured by the electrical power consumption measuring device, when the time during which the electricity storage device has been placed out of the charging mode reaches the non-charge sustain time set by the non-charge sustain time setting device.

According to the above control apparatus for an on-vehicle electricity storage device, the electricity storage device is placed in the charging mode when it is determined by the electrical power consumption measuring device that the electrical power being consumed in the vehicle is equal to or greater than a predetermined value. In addition, the charging mode executing device places the electricity storage device in the charging mode, regardless of the consumed electrical power measured by the electrical power consumption measuring device, when the time during which the electricity storage device has been placed out of the charging mode reaches the non-charge sustain time set by the non-charge sustain time setting device even if the electrical power being consumed is less than a predetermined value.

As a result, the electricity storage device can be appropriately placed in the charging mode when the state of charge of the electricity storage device is decreased because the electricity storage device has been placed out of the charging mode for a long period while the consumed electrical power is relatively low.

In the above control apparatus for an on-vehicle electricity storage device, the non-charge sustain time setting device may be adapted to set the non-charge sustain time to be zero when the sustain time measured by the voltage sustain time measuring device is less than a predetermined lower threshold sustain time, and to set the non-charge sustain time to be a predetermined upper limit sustain time when the sustain time measured by the voltage sustain time measuring device is greater than a predetermined upper threshold sustain time.

According to the above control apparatus for an on-vehicle electricity storage device, after the electricity storage device is placed out of the charging mode, the non-charge sustain time setting device sets the non-charge sustain time to be zero when the sustain time measured by the voltage sustain time measuring device is less than a predetermined lower threshold sustain time because it is determined that the state of charge of the electricity storage device is less than a predetermined value.

In contrast, the non-charge sustain time setting device sets the non-charge sustain time to be a predetermined upper limit sustain time when the sustain time measured by the voltage sustain time measuring device is greater than a predetermined upper threshold sustain time in order to prevent the electricity storage device from being placed in an over-discharged state due to being placed in a non-charged state for an excessively long period.

The above control apparatus for an on-vehicle electricity storage device may further include a non-charge sustain time correction device for correcting the non-charge sustain time, which is set by the non-charge sustain time setting device, depending on the electrical power being consumed, which is measured by the electrical power consumption measuring device, during a sustain time which begins when the electricity storage device is placed out of the charging mode by the charge control device, and during which the inter-terminal voltage measured by the inter-terminal voltage measuring device remains equal to or greater than a predetermined value.

According to the above control apparatus for an on-vehicle electricity storage device, when the electricity storage device is placed out of the charging mode, and the electrical power being consumed, which is measured by the electrical power consumption measuring device, is greater than a predetermined value, the non-charge sustain time correction device corrects the non-charge sustain time so as to be longer. This control operation is preferable because, in general, when the electrical power being consumed is greater, the state of charge of the electricity storage device is greater, and thus the electricity storage device can be placed out of the charging mode for a longer time.

As a result, a more precise control of the electricity storage device can be executed.

The present invention provides another control apparatus for an on-vehicle electricity storage device, which is installed in a vehicle having an internal combustion engine and a motor capable of electrical power generation as power sources, a main electricity storage device for storing electrical energy which is converted from output power of the internal combustion engine or from a portion of the kinetic energy of the vehicle using the motor, and an auxiliary electricity storage device connected to the main electricity storage device. The control apparatus includes: an electrical power consumption measuring device for measuring electrical power being consumed in the vehicle; a charge control device for controlling the auxiliary electricity storage device depending on the consumed electrical power measured by the electrical power consumption measuring device so that the auxiliary electricity storage device is placed in and out of a charging mode in which the electrical energy or electrical energy supplied from the main electricity storage device is charged into the auxiliary electricity storage device; an inter-terminal voltage measuring device for measuring the inter-terminal voltage of the electricity storage device; a voltage sustain time measuring device for measuring a sustain time which begins when the electricity storage device is placed out of the charging mode by the charge control device, and during which the inter-terminal voltage measured by the inter-terminal voltage measuring device is maintained to be equal to or greater than a predetermined value; and a non-charge sustain time setting device for setting a non-charge sustain time, during which the electricity storage device is kept out of the charging mode, depending on the sustain time measured by the voltage sustain time measuring device.

According to the above control apparatus for an on-vehicle electricity storage device, when the auxiliary electricity storage device such as a 12-volt lead storage battery is placed out of the charging mode because it is determined by the electrical power consumption measuring device that the electrical power being consumed in the vehicle is less than a predetermined value, and when it is determined by the inter-terminal voltage measuring device that the inter-terminal voltage of the auxiliary electricity storage device is equal to or greater than a predetermined value, it is determined that the state of charge of the auxiliary electricity storage device is equal to or greater than a predetermined value, and the non-charge sustain time setting device sets a longer non-charge sustain time as the sustain time measured by the voltage sustain time measuring device is longer.

As a result, the electrical power generation operation for the auxiliary electricity storage device can be appropriately controlled; therefore, a reduction in the useful life of the auxiliary electricity storage device can be prevented, which could occur if the auxiliary electricity storage device is too frequently placed in an over-discharged state, and also a reduction in the vehicle's fuel economy can be prevented, which could occur if the internal combustion engine is too frequently used for electrical power generation.

DESCRIPTION OF THE PREFERRED EMBODIMENTS

An embodiment of the control apparatus for on-vehicle electricity storage device according to the present invention will be explained below with reference to the appended drawings.

Figure 1:
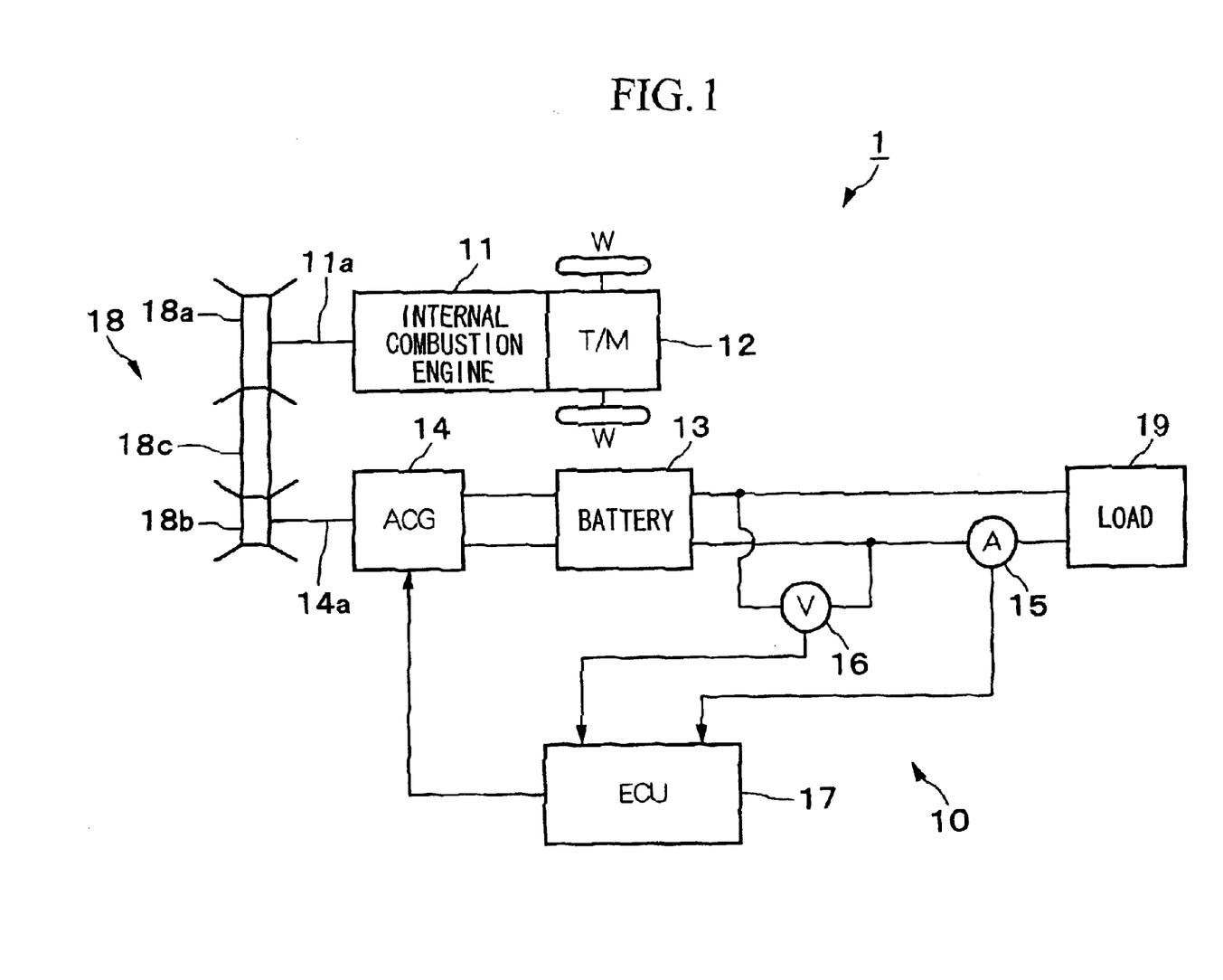
FIG. 1 is a schematic diagram showing the general structure of a vehicle having a control apparatus for an on-vehicle electricity storage device according to an embodiment of the present invention.

As shown in FIG. 1, the control apparatus 10 for on-vehicle electricity storage device according to the present embodiment is installed in a vehicle 1 in which the driving power of an internal combustion engine 11 is transmitted to driving wheels W via a transmission such as a CVT or a manual transmission. The control apparatus 10 is provided for controlling a charging operation for a battery 13 such as a 12-volt lead storage battery which operates various electrical accessories. The control apparatus 10 includes the battery 13, an AC generator 14, an electrical current sensor 15, a voltage sensor 16, and an ECU (electrical control unit) 17.

The crankshaft 11a of the internal combustion engine 11 is connected to the rotational shaft 14a of the AC generator 14 via a drive power transmitting device 18, and thus the AC generator 14 can generate electrical power by being driven by the internal combustion engine 11 via the drive power transmitting device 18.

The drive power transmitting device 18 includes a crankshaft pulley 18a which is integrated with the crankshaft 11a of the internal combustion engine 11, a drive shaft pulley 18b which forms a pair with the crankshaft pulley 18a, and which is integrated with the rotational shaft 14a of the AC generator 14, and a belt 18c which is wound around the crankshaft pulley 18a and the drive shaft pulley 18b.

In other words, the driving power of the internal combustion engine 11 is transmitted to the AC generator 14 via the crankshaft pulley 18a, the belt 18c, and the drive shaft pulley 18b.

The battery 13 is connected to the AC generator 14, and the AC generator 14 generates AC power by being driven by the internal combustion engine 11 while being controlled by the ECU 17. The generated AC power is rectified into DC power, and then the DC power charges the battery 13.

As will be explained in detail later, the ECU 17 controls a charging operation for the battery 13, i.e., a power generation operation of the AC generator 14, depending on electrical power being consumed in the vehicle 1, i.e., an average consumption current ELAVE flowing through a load 19 consisting of on-vehicle electrical devices such as various lamps, a compressor for air conditioning, etc., as well as an inter-terminal voltage VB of the battery 13.

The ECU sets a charging mode, in which the voltage of the DC power obtained from the AC generator is set to 14.5 volts, when the battery 13 is charged, and on the other hand, the ECU sets a non-charging mode, in which the voltage of the DC power obtained from the AC generator is set to 12.5 volts, when the battery 13 is not charged.

With regard to the AC generator 14, the charging mode is set as a normal mode, and the non-charging mode is set in accordance with a control command from the ECU 17. More specifically, the charging mode is set when a control command ACGC-DVC, which indicates whether a control operation is executed on the AC generator 14, is in the OFF state, and the non-charging mode is set when the control command ACGC-DVC is in the ON state.

To this end, signals from the electrical current sensor 15 which represent electrical current flowing from the battery 13 to the load 19, i.e., the average consumption current ELAVE flowing through the load 19, and signals from the voltage sensor 16 which represent the inter-terminal voltage VB of the battery 13 are input to the ECU 17.

The control apparatus 10 for on-vehicle electricity storage device according to the present embodiment is configured as explained above. Next, the operation of the control apparatus 10, in particular, the control operation for the generator 14 which is used for charging the battery 13, will be explained below with reference to the appended drawings.

The control routine explained below is repeated at a predetermined interval, for example, every 200 ms.

Figure 2:
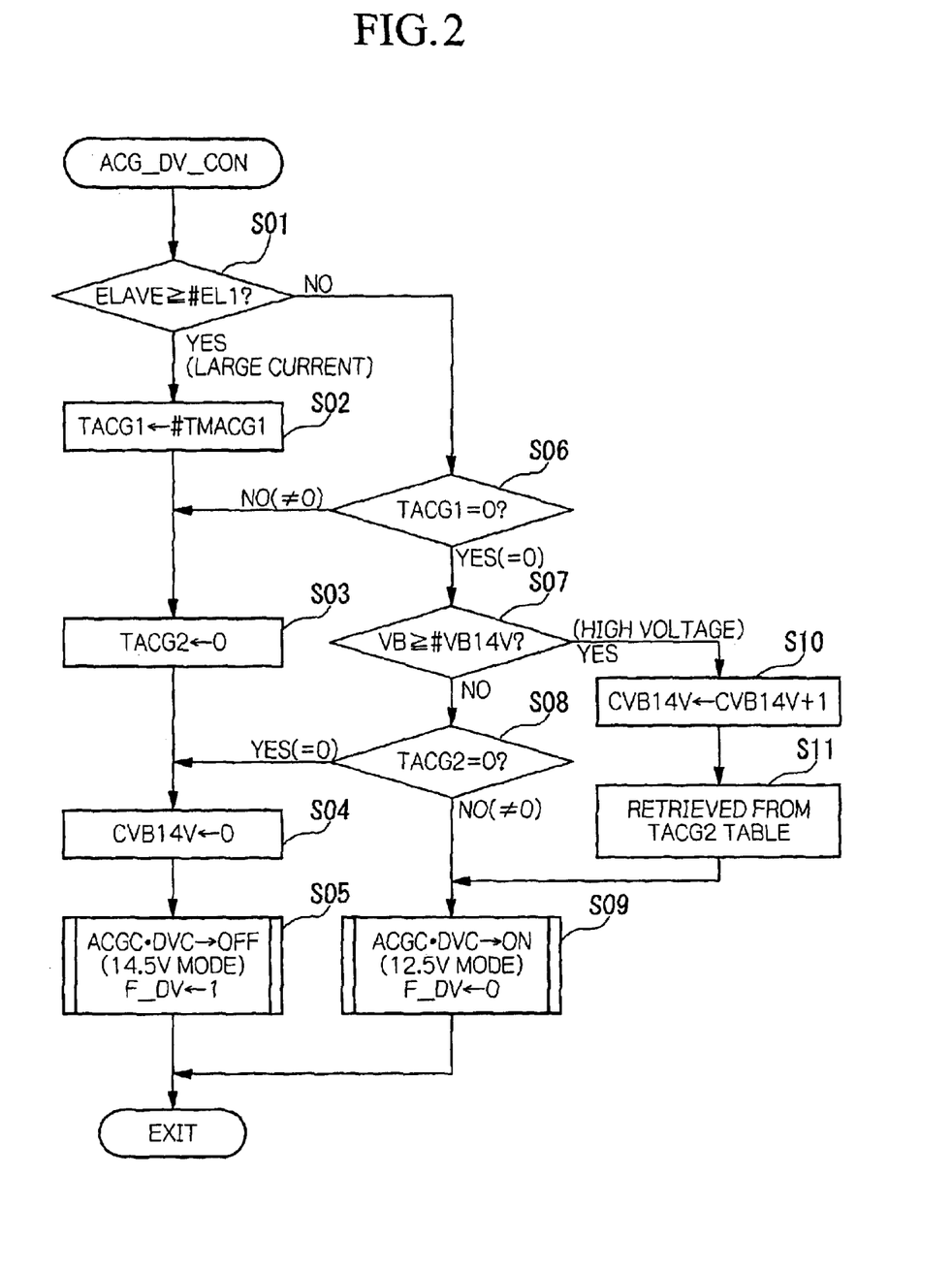
FIG. 2 is a flowchart showing the operation of the control apparatus for an on-vehicle electricity storage device shown in FIG. 1.

In step S01 shown in FIG. 2, it is determined whether the average consumption current ELAVE is equal to or greater than a predetermined current value #EL1 (e.g., approximately 21 A (amperes) as a high side, and approximately 17 A as a low side, with hysteresis).

When the result of determination is "YES", the operation proceeds to step S02.

In contrast, when the result of determination is "NO", the operation proceeds to step S06, which will be explained later.

Note that the predetermined current value #EL1 is set with a predetermined hysteresis.

In step S02, a timer value of a transition delay time subtraction timer TACG1, which is provided for setting a delay time in a transition from the charging mode to the non-charging mode, is set to a predetermined transition delay timer value #TMACG1 (e.g., approximately 4.0 seconds).

Next, in step S03, a sustain time subtraction timer TACG2, which is provided for setting a sustain time of the non-charging mode, is set to zero.

In step S04, a counter value of a high voltage maintaining counter CVB14V is set to zero. The high voltage maintaining counter CVB14V is provided for setting a sustain time during which the inter-terminal voltage VB of the battery 13 is equal to or greater than a predetermined mode switching threshold voltage #VB14V (e.g., approximately 13.0 V (volts) as a high side, and approximately 12.8 V as a low side, with hysteresis) after the transition from the charging mode to the non-charging mode.

In step S05, the control command ACGC-DVC is set to the OFF state so that the battery 13 is placed in the charging mode, and the flag value of a flag F_DV is set to "1", which means that the consumed electrical power in the load 19 in the 12-volt system is relatively high, and then the series of operations is terminated.

In step S06, it is determined whether the timer value of the transition delay time subtraction timer TACG1 is zero.

When the result of determination is "NO", the operation proceeds to step S03, which was explained above.

In contrast, when the result of determination is "YES", the operation proceeds to step S07.

In step S07, it is determined whether the inter-terminal voltage VB is equal to or greater than the predetermined mode switching threshold voltage #VB14V (e.g., approximately 13.0 V (volts) as a high side, and approximately 12.8 V as a low side, with hysteresis).

When the result of determination in step S07 is "NO", the operation proceeds to step S08.

In contrast, when the result of determination in step S07 is "YES", the operation proceeds to step S10.

In step S08, it is determined whether the timer value of the sustain time subtraction timer TACG2 is zero.

When the result of determination is "YES", the operation proceeds to step S04, which was explained above.

In contrast, when the result of determination is "NO", the operation proceeds to step S09.

In step S09, the control command ACGC-DVC is set to the ON state so that the battery 13 is placed in the non-charging mode, and the flag value of the flag F_DV is set to "0", which means that the consumed electrical power in the load 19 in the 12-volt system is relatively low, and then the series of operations is terminated.

In step S10, a counter value obtained by adding "1" to the previous high voltage maintaining counter CVB14V is set as a new high voltage maintaining counter CVB14V.

Figure 3:
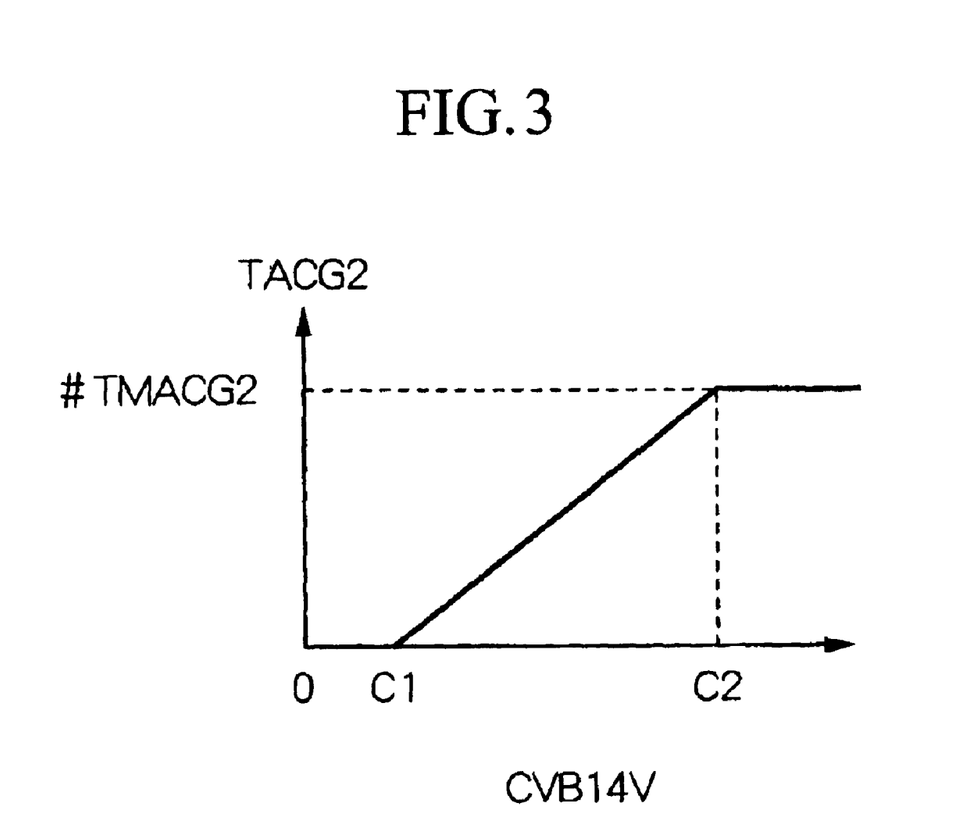
FIG. 3 is a graph showing an example of relationship between a counter value of a high voltage maintaining counter CVB14V and a timer value of a sustain time subtraction timer TACG2.

In step S11, the timer value of the sustain time subtraction timer TACG2 is set to a value retrieved from a table depending on the counter value of the high voltage maintaining counter CVB14V, and the operation proceeds to step S09, which was explained above. The table, which is represented by FIG. 3, defines the relationship between the counter value of the high voltage maintaining counter CVB14V and the timer value of the sustain time subtraction timer TACG2 in such a manner that the timer value of the sustain time subtraction timer TACG2 increases from zero to an upper limit time #TMACG2 (e.g., approximately 60 seconds) when the counter value of the high voltage maintaining counter CVB14V is increased from a predetermined first counter value C1 (>0) to a predetermined second counter value C2 (>0).

Figure 4A:
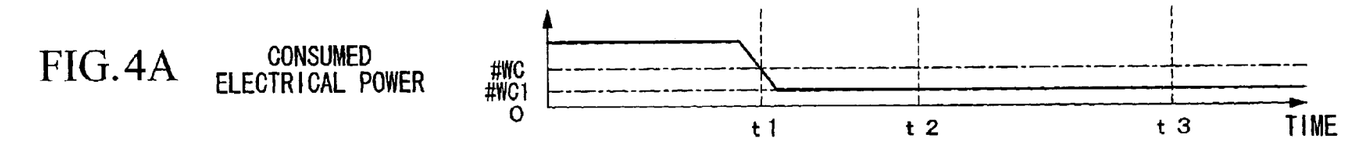
FIG. 4A is a graph showing an example of the electrical power consumed in a vehicle.
Figure 4B:
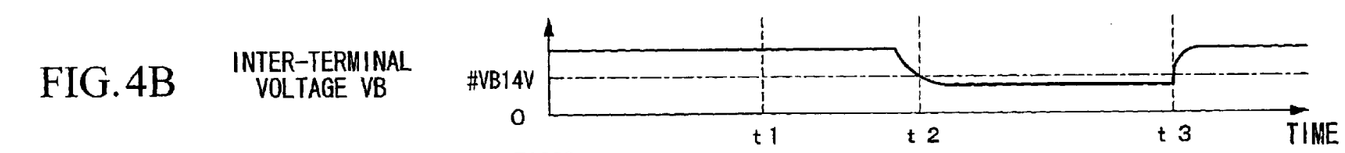
FIG. 4B is a time-domain chart showing an example of changes in an inter-terminal voltage VB of a battery.
Figure 4C:
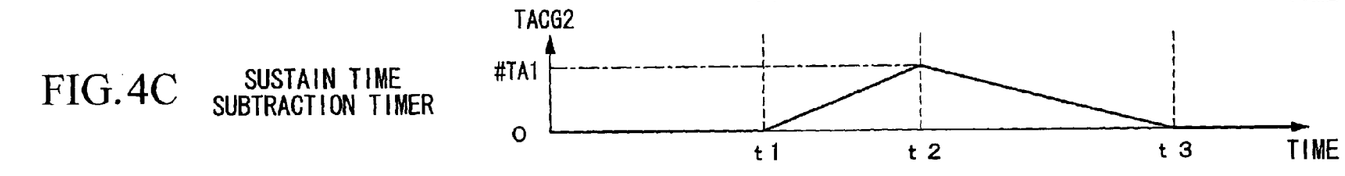
FIG. 4C is a time-domain chart showing an example of changes in the timer value of the sustain time subtraction timer TACG2.
Figure 4D:
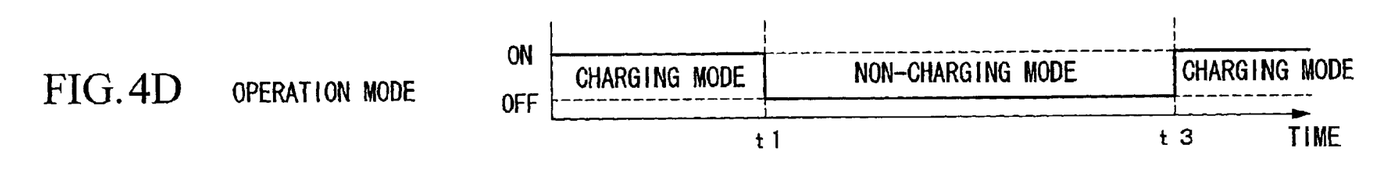
FIG. 4D is a time-domain chart showing an example of changes in the operation mode of an AC generator.

At time t1, at which the electrical power consumed in the vehicle 1 decreases to the level below a predetermined power value #WC as shown in FIG. 4A, i.e., when the average consumption current ELAVE, which is determined based on the signals from the electrical current sensor 15, decreases to a level below a predetermined current value #EL1, the operation mode of the AC generator 14 is switched from the charging mode to the non-charging mode as shown in FIG. 4D.

At this time, the inter-terminal voltage VB of the battery 13 does not decrease upon the stopping of the charging mode, but is maintained to be greater than the predetermined mode switching threshold voltage #VB14V for a certain period as shown in FIG. 4B.

As shown in FIG. 4C, after time t1, the counter value of the high voltage maintaining counter CVB14V is increased over the period in which the inter-terminal voltage VB of the battery 13 is maintained to be greater than the predetermined mode switching threshold voltage #VB14V, and the timer value of the sustain time subtraction timer TACG2 is also increased in accordance with the counter value.

At time t2 at which the inter-terminal voltage VB of the battery 13 decreases to a level below the predetermined mode switching threshold voltage #VB14V as shown in FIG. 4B, addition to the counter value of the high voltage maintaining counter CVB14V is stopped as shown in FIG. 4C, renewal of the timer value of the sustain time subtraction timer TACG2 is stopped, and the present timer value is set to the timer value of the sustain time subtraction timer TACG2.

As a result, the timer value of the sustain time subtraction timer TACG2 is decreased after time t2, and at time t3 at which the timer value becomes zero, the non-charging mode is stopped, and the operation mode is switched from the non-charging mode to the charging mode as shown in FIG. 4D. By this switching operation, the inter-terminal voltage VB of the battery 13 increases to a level above the predetermined mode switching threshold voltage #VBI4V as shown in FIG. 4B.

According to the control apparatus 10 for an on-vehicle electricity storage device in the present embodiment, the sustain time of the non-charging mode after the operation mode is switched from the charging mode to the non-charging mode is set depending on the sustain time in which the inter-terminal voltage VB of the battery 13 is maintained to be greater than the predetermined mode switching threshold voltage #VB14V. Because the sustain time of the inter-terminal voltage VB of the battery 13 varies depending on the state of charge of the battery 13, the sustain time of the non-charging mode can be appropriately set depending on the state of charge of the battery 13. As a result, a reduction in the useful life of the battery 13 can be prevented, which could occur if the battery 13 is too frequently placed in an over-discharged state, and also a reduction in the vehicle's fuel economy can be prevented, which could occur if the internal combustion engine 11 is too frequently used for electrical power generation.

Moreover, the timer value of the sustain time subtraction timer TACG2 can be appropriately set depending on the counter value of the high voltage maintaining counter CVB14V using the above-mentioned table. For example, by setting the timer value of the sustain time subtraction timer TACG2 to be zero when the counter value of the high voltage maintaining counter CVB14V is equal to or less than the predetermined first counter value C1, frequent switching operations between the charging mode and the non-charging mode at short intervals can be prevented.

On the other hand, by setting the timer value of the sustain time subtraction timer TACG2 to be the predetermined upper limit time #TMACG2 when the counter value of the high voltage maintaining counter CVB14V is equal to or greater than the predetermined second counter value C2, the non-charging mode can be terminated at an appropriate timing without providing an additional specific device.

Figure 5:
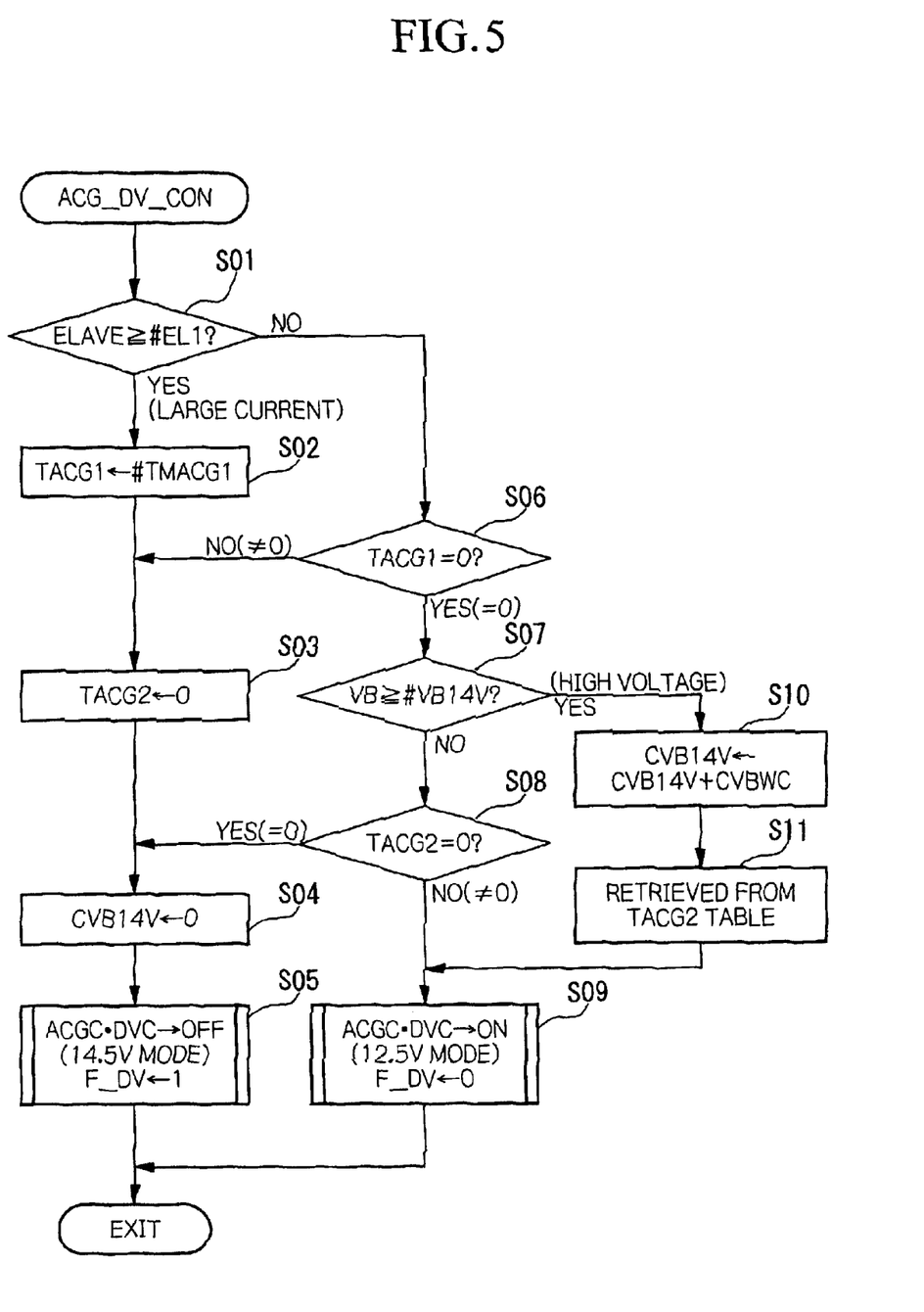
FIG. 5 is a flowchart showing the operation of another control apparatus for an on-vehicle electricity storage device derived from the above embodiment.

In the above embodiment, "1" is added to the counter value of the high voltage maintaining counter CVB14V in step S10; however, this is merely an example, and as in step S10 in an alternative configuration shown in FIG. 5, a counter value, which is obtained by adding an addition value CVBWC that is set depending on the electrical power consumed in the vehicle 1 to the counter value of the high voltage maintaining counter CVB14V, may be set as a new counter value of the high voltage maintaining counter CVB14V.

Figure 6:
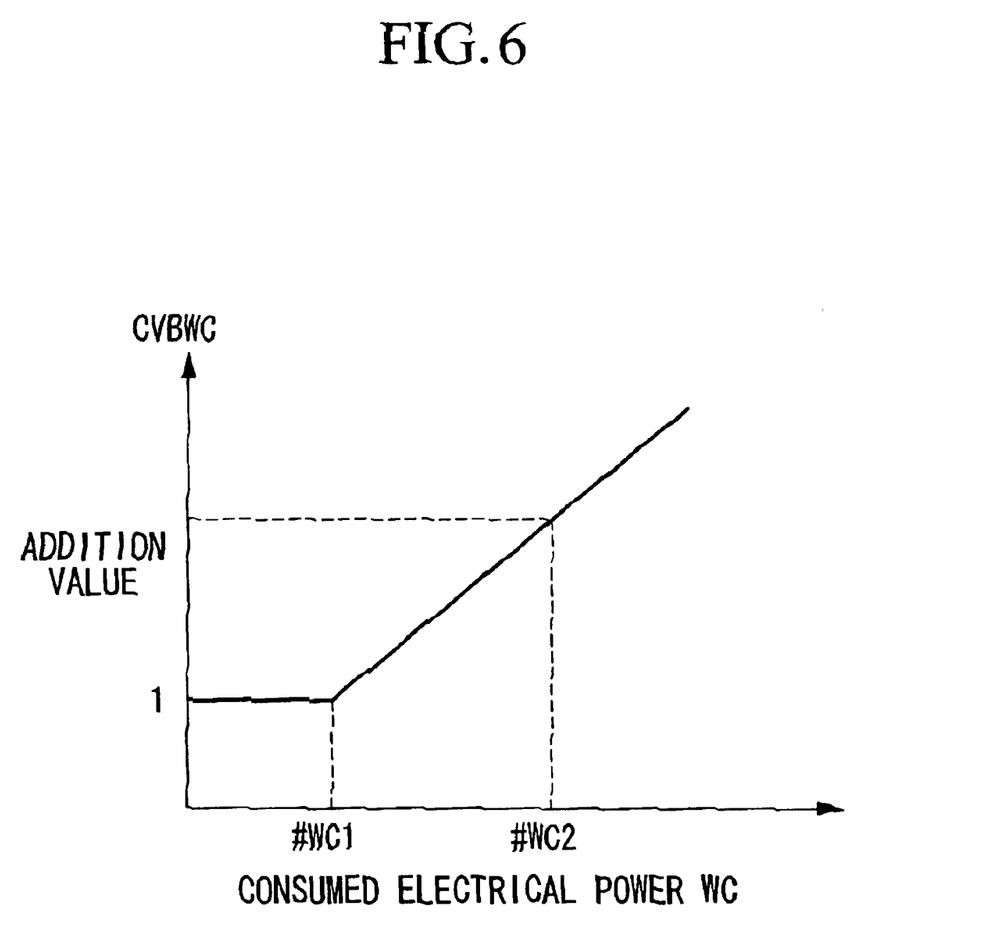
FIG. 6 is a graph showing an example of the relationship between the consumed electrical power WC and an addition value CVBWC.

In this case, the addition value CVBWC is, for example, determined so as to increase when the consumed electrical power WC is increased as shown in FIG. 6.

Figure 7A:
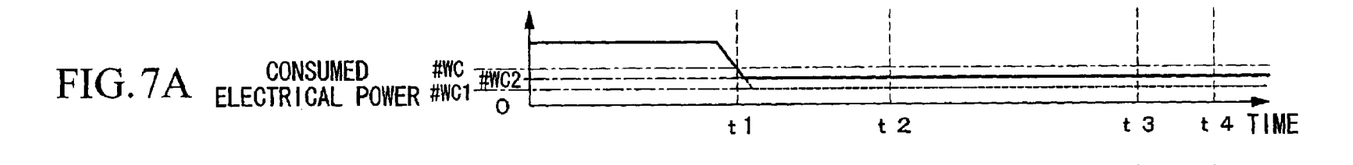
FIG. 7A is a graph showing an alternative example of the electrical power consumed in a vehicle.
Figure 7B:
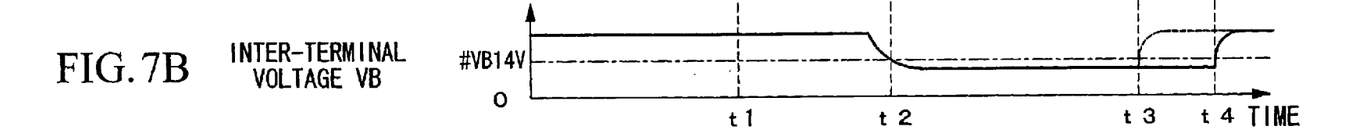
FIG. 7B is a time-domain chart showing an alternative example of changes in an inter-terminal voltage VB of a battery.

As shown in FIG. 7A, after time t1, when the electrical power consumed in the vehicle 1 decreases to #WC2 (indicated by a solid line in FIG. 7A) which is less than a predetermined power value #WC and is greater than a normal consumed electrical power #WC1 (indicated by a broken line in FIG. 7A), the counter value of the high voltage maintaining counter CVB14V is increased by the addition value CVBWC, which is greater than a normal addition value (e.g., "1"), over the period (from time t1 to t2) in which the inter-terminal voltage VB of the battery 13 is maintained to be greater than the predetermined mode switching threshold voltage #VB14V after time t1 as shown FIG. 7B.

Figure 7C:
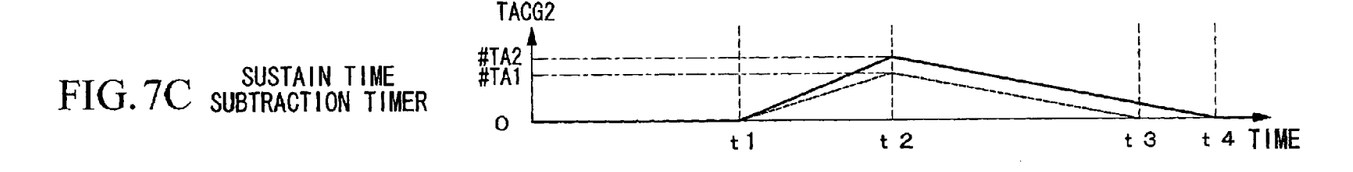
FIG. 7C is a time-domain chart showing an alternative example of changes in the timer value of the sustain time subtraction timer TACG2.

As a result, as shown in FIG. 7C, the timer value of the sustain time subtraction timer TACG2, which is set depending on the counter value of the high voltage maintaining counter CVB14V, is increased (indicated by a solid line in FIG. 7C) at a rate greater than the normal rate (indicated by a broken line in FIG. 7C), and at time t2 at which the inter-terminal voltage VB of the battery 13 decreases to a level less than the predetermined mode switching threshold voltage #VB14V, a timer value #TA2, which is greater than the normal timer value #TA1, is set to the timer value of the sustain time subtraction timer TACG2.

Figure 7D:
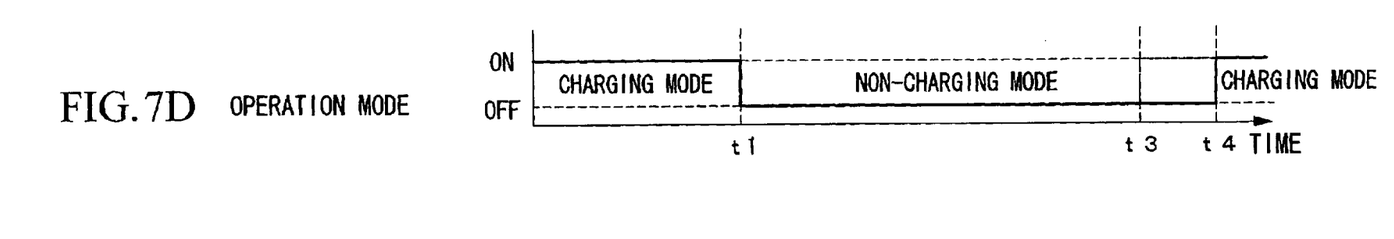
FIG. 7D is a time-domain chart showing an alternative example of changes in the operation mode of an AC generator.

The timer value of the sustain time subtraction timer TACG2 is decreased after time t2, and the timer value reaches zero at time t4 which is delayed compared with the normal time t3. At time t4, the non-charging mode is stopped, and the operation mode is switched from the non-charging mode to the charging mode as shown in FIG. 7D. By this switching operation, the inter-terminal voltage VB of the battery 13 increases to a level above the predetermined mode switching threshold voltage #VB14V as shown in FIG. 7B.

In this case, because the timer value of the sustain time subtraction timer TACG2 is changed depending on the consumed electrical power WC, a more precise control can be performed.

Figure 8:
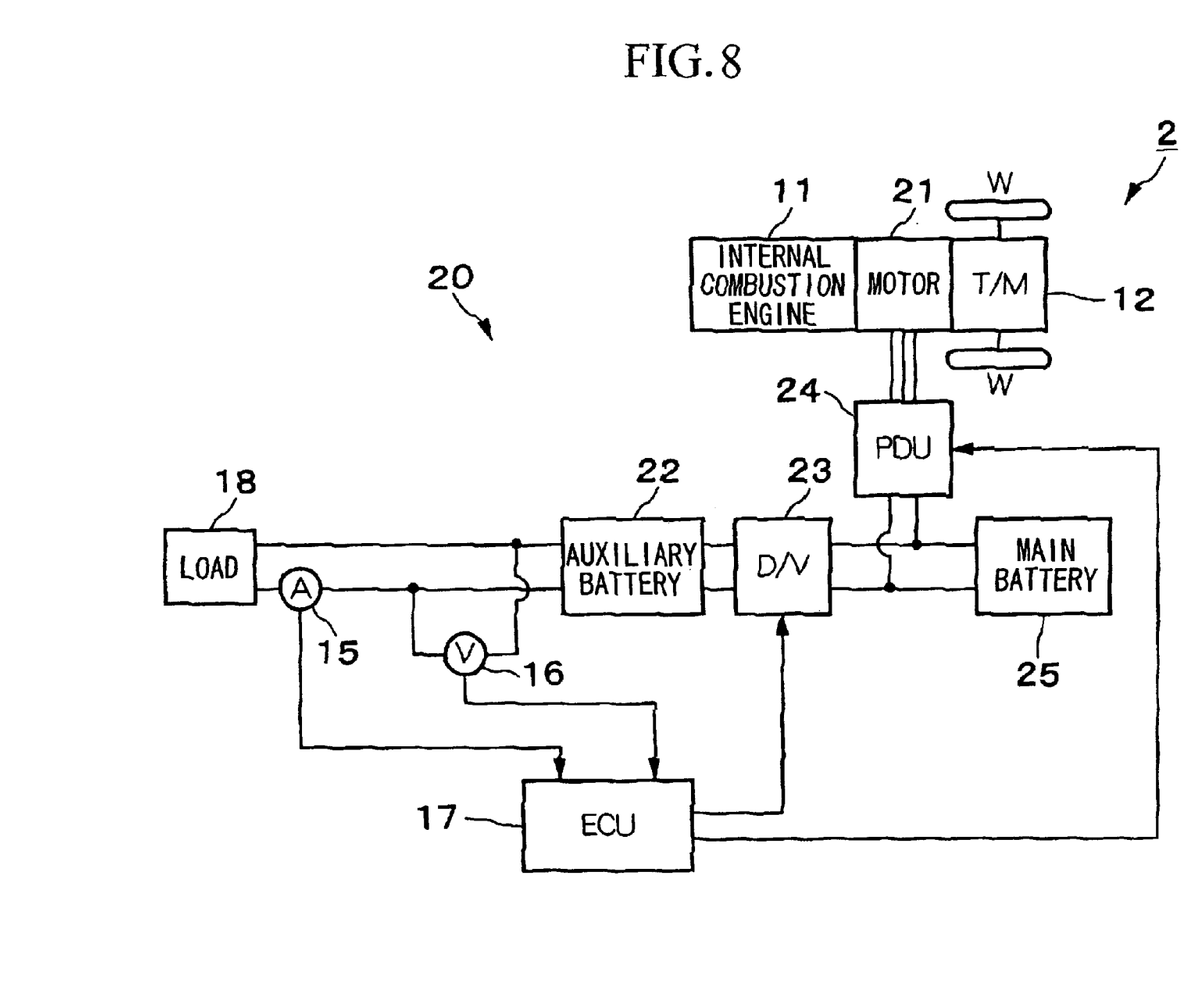
FIG. 8 is a schematic diagram showing the general structure of a vehicle having a control apparatus for an on-vehicle electricity storage device according to an alternative embodiment of the present invention.

In the above embodiments, the control apparatus 10 for the on-vehicle electricity storage device is installed in the vehicle 1 having the internal combustion engine 11 as a power source; however, the present invention is not limited to this, and a control apparatus 20 for an on-vehicle electricity storage device, as an alternative embodiment, may be installed in a hybrid vehicle 2 in which driving power from at least one of an internal combustion engine 11 and a motor 21 is transmitted to the driving wheels W via a transmission 12.

In this alternative embodiment, the control apparatus 20 for the on-vehicle electricity storage device is provided for controlling a charging operation for an auxiliary battery 22 such as a 12-volt lead storage battery which operates various electrical accessories. The control apparatus 20 includes the auxiliary battery 22, a downverter 23, the electrical current sensor 15, the voltage sensor 16, and the ECU 17.

In this alternative embodiment, the hybrid vehicle 2 is a parallel hybrid vehicle in which the internal combustion engine 11, the motor 21, and the transmission 12 are directly connected to each other in series, and the driving power of the internal combustion engine 11 and the motor 21 are transmitted to the driving wheels W via a transmission 12 such as a CVT or a manual transmission. When the hybrid vehicle 2 decelerates, the driving power is transmitted from the driving wheels W to the motor 21, the motor 21 acts as a generator so as to produce a so-called regenerative braking force, by which the kinetic energy is recovered as electrical energy.

The powering operation and regenerative operation of the motor 21 is executed by a power drive unit (PDU) 24 by receiving a control command from the ECU 17. To the PDU 24, a main battery 25 such as a high voltage nickel metal hydride (Ni-MH) battery, which receives energy from and sends energy to the motor 21, is connected. The main battery 25 includes a plurality of modules, which are connected to each other in series, and each of which consists of a plurality of cells which are connected to each other in series.

The auxiliary battery 22 is connected to the main battery 25 via a downverter 23, which is, for example, a DC—DC converter. While receiving the control command from the ECU 17, the downverter 23 performs a charging operation for the auxiliary battery 22 by stepping down the voltage of the main battery 25, or by stepping down the voltage of the electrical power generated by the motor 21 via the power drive unit 24.

The ECU 17 controls a charging operation for the auxiliary battery 22, i.e., the operation of the downverter 23, depending on electrical power being consumed in the hybrid vehicle 2, i.e., an average consumption current ELAVE flowing through the load 19 consisting of on-vehicle electrical devices such as various lamps, a compressor for air conditioning, etc., as well as the inter-terminal voltage VB of the auxiliary battery 22.

When the auxiliary battery 22 is charged, the ECU 17 sets a charging mode in which the voltage of the DC power obtained by the step down operation of the downverter 23 is set to 14.5 volts, and on the other hand, when the auxiliary battery 22 is not charged, the ECU 17 sets a non-charging mode in which the voltage of the DC power obtained by the step down operation of the downverter 23 is set to 12.5 volts.

With regard to the downverter 23, the charging mode is set as a normal mode, and the non-charging mode is set in accordance with a control command from the ECU 17. More specifically, the charging mode is set when a control command ACGC-DVC, which indicates whether a control operation is executed on the downverter 23, is in the OFF state, and the non-charging mode is set when the control command ACGC-DVC is in the ON state.

Advantageous Effects Obtainable by the Invention

As explained above, according to the control apparatus for an on-vehicle electricity storage device of the present invention, the electrical power generation operation of the motor, which is provided for charging the electricity storage device, can be appropriately controlled; therefore, a reduction in the useful life of the electricity storage device can be prevented, which could occur if the electricity storage device is too frequently placed in an over-discharged state, and also a reduction in the vehicle's fuel economy can be prevented, which could occur if the internal combustion engine is too frequently used for electrical power generation.

According to another control apparatus for an on-vehicle electricity storage device of the present invention, the power generation operation of the motor can be appropriately performed when the state of charge of the electricity storage device is decreased because the electricity storage device has been placed out of the charging mode for a long period while the consumed electrical power is relatively low.

According to another control apparatus for an on-vehicle electricity storage device of the present invention, the non-charge sustain time, during which the electricity storage device is kept out of the charging mode, can be appropriately set depending on the sustain time measured by the voltage sustain time measuring device. In particular, a predetermined sustain time, i.e., an upper limit value, can be easily set for the non-charge sustain time; therefore, the non-charging mode can be terminated at an appropriate timing without providing an additional specific device.

According to another control apparatus for an on-vehicle electricity storage device of the present invention, because the non-charge sustain time is corrected depending on the consumed electrical power, a more precise control of the electricity storage device can be executed.

According to another control apparatus for an on-vehicle electricity storage device of the present invention, the electrical power generation operation of the motor, which is provided for charging the auxiliary electricity storage device, can be appropriately controlled; therefore, a reduction in the useful life of the auxiliary electricity storage device can be prevented, which could occur if the auxiliary electricity storage device is too frequently placed in an over-discharged state, and also a reduction in the vehicle's fuel economy can be prevented, which could occur if the internal combustion engine is too frequently used for electrical power generation.

What is claimed is:

1. A control apparatus for an on-vehicle electricity storage device, which is installed in a vehicle having an internal combustion engine as a power source, a motor capable of electrical power generation, and an electricity storage device, the control apparatus comprising:
   an electrical power consumption measuring device for measuring electrical power being consumed in the vehicle;
   a charge control device for controlling the electricity storage device depending on the consumed electrical power measured by the electrical power consumption measuring device so that the electricity storage device is placed in and out of a charging mode in which electrical energy, which is converted from output power of the internal combustion engine or from a portion of a kinetic energy of the vehicle using the motor, is charged into the electricity storage device;
   an inter-terminal voltage measuring device for measuring the inter-terminal voltage of the electricity storage device;
   a voltage sustain time measuring device for measuring a sustain time which begins when the electricity storage device is placed out of the charging mode by the charge control device, and during which the inter-terminal voltage measured by the inter-terminal voltage measuring device remains equal to or greater than a predetermined value; and
   a non-charge sustain time setting device for setting a non-charge sustain time, during which the electricity storage device is kept out of the charging mode, depending on the sustain time measured by the voltage sustain time measuring device.

2. A control apparatus for an on-vehicle electricity storage device according to claim 1, further comprising a charging mode executing device for placing the electricity storage device in the charging mode, regardless of the consumed electrical power measured by the electrical power consumption measuring device, when the time during which the electricity storage device has been placed out of the charging mode reaches the non-charge sustain time set by the non-charge sustain time setting device.

3. A control apparatus for an on-vehicle electricity storage device according to claim 1, wherein the non-charge sustain time setting device is adapted to set the non-charge sustain time to be zero when the sustain time measured by the voltage sustain time measuring device is less than a predetermined lower threshold sustain time, and to set the non-charge sustain time to be a predetermined upper limit sustain time when the sustain time measured by the voltage sustain time measuring device is greater than a predetermined upper threshold sustain time.

4. A control apparatus for an on-vehicle electricity storage device according to claim 1, further comprising a non-charge sustain time correction device for correcting the non-charge sustain time, which is set by the non-charge sustain time setting device, depending on the electrical power being consumed, which is measured by the electrical power consumption measuring device, during a sustain time which begins when the electricity storage device is placed out of the charging mode by the charge control device, and during which the inter-terminal voltage measured by the inter-terminal voltage measuring device remains equal to or greater than a predetermined value.

5. A control apparatus for an on-vehicle electricity storage device, which is installed in a vehicle having an internal combustion engine and a motor capable of electrical power generation as power sources, a main electricity storage device for storing electrical energy which is converted from output power of the internal combustion engine or from a portion of a kinetic energy of the vehicle using the motor, and an auxiliary electricity storage device connected to the main electricity storage device, the control apparatus comprising:
   an electrical power consumption measuring device for measuring electrical power being consumed in the vehicle;
   a charge control device for controlling the auxiliary electricity storage device depending on the consumed electrical power measured by the electrical power consumption measuring device so that the auxiliary electricity storage device is placed in and out of a charging mode in which the electrical energy supplied from the motor or electrical energy supplied from the main electricity storage device is charged into the auxiliary electricity storage device;
   an inter-terminal voltage measuring device for measuring the inter-terminal voltage of the electricity storage device;
   a voltage sustain time measuring device for measuring a sustain time which begins when the electricity storage device is placed out of the charging mode by the charge control device, and during which the inter-terminal voltage measured by the inter-terminal voltage measuring device is maintained to be equal to or greater than a predetermined value; and
   a non-charge sustain time setting device for setting a non-charge sustain time, during which the electricity storage device is kept out of the charging mode, depending on the sustain time measured by the voltage sustain time measuring device.

6. A control apparatus for an on-vehicle electricity storage device according to claim 5, further comprising a charging mode executing device for placing the electricity storage device in the charging mode, regardless of the consumed electrical power measured by the electrical power consumption measuring device, when the time during which the electricity storage device has been placed out of the charging mode reaches the non-charge sustain time set by the non-charge sustain time setting device.

7. A control apparatus for an on-vehicle electricity storage device according to claim 5, wherein the non-charge sustain time setting device is adapted to set the non-charge sustain time to be zero when the sustain time measured by the voltage sustain time measuring device is less than a predetermined lower threshold sustain time, and to set the non-charge sustain time to be a predetermined upper limit sustain time when the sustain time measured by the voltage sustain time measuring device is greater than a predetermined upper threshold sustain time.

8. A control apparatus for an on-vehicle electricity storage device according to claim 5, further comprising a non-charge sustain time correction device for correcting the non-charge sustain time, which is set by the non-charge sustain time setting device, depending on the consumed electrical power measured by the electrical power consumption measuring device during a sustain time which begins when the electricity storage device is placed out of the charging mode by the charge control device, and during which the inter-terminal voltage measured by the inter-terminal voltage measuring device remains equal to or greater than a predetermined value.

* * * * *